(12) United States Patent
Jones et al.

(10) Patent No.: US 9,011,082 B2
(45) Date of Patent: Apr. 21, 2015

(54) GAS TURBINE ENGINE DUCT BLOCKER WITH ROTATABLE VANE SEGMENTS

(75) Inventors: James Jones, Palm City, FL (US); Roger W. Bursey, Jr., Jupiter, FL (US); John H. Maurer, Stuart, FL (US); Larry B. Hawke, Hobe Sound, FL (US); Ronald T. Clawson, Manchester, CT (US); Andrew P. Olech, Enfield, CT (US)

(73) Assignee: United Technologies Corporation, Hartford, CT (US)

( * ) Notice: Subject to any disclaimer, the term of this patent is extended or adjusted under 35 U.S.C. 154(b) by 685 days.

(21) Appl. No.: 13/335,562

(22) Filed: Dec. 22, 2011

(65) Prior Publication Data

US 2013/0164117 A1    Jun. 27, 2013

(51) Int. Cl.
| | |
|---|---|
| F04D 29/56 | (2006.01) |
| F01D 17/14 | (2006.01) |
| F02C 9/18 | (2006.01) |
| F02K 1/82 | (2006.01) |
| F02K 3/075 | (2006.01) |

(52) U.S. Cl.
CPC .............. *F01D 17/141* (2013.01); *F02C 9/18* (2013.01); *F02K 1/822* (2013.01); *F02K 3/075* (2013.01); *F05D 2240/50* (2013.01); *F05D 2250/411* (2013.01); *Y02T 50/675* (2013.01)

(58) Field of Classification Search
CPC ..... F01D 17/14; F01D 17/141; F01D 17/148; F01D 17/16; F01D 17/167; F01D 17/162; F02K 1/96; F02K 1/06
USPC ......... 415/159, 127, 126, 129, 130, 140, 155, 415/166, 167, 145
See application file for complete search history.

(56) References Cited

U.S. PATENT DOCUMENTS

| | | |
|---|---|---|
| 3,887,297 A | 6/1975 | Welchek |
| 4,053,256 A | 10/1977 | Hertel |
| 4,409,788 A | 10/1983 | Nash et al. |

(Continued)

FOREIGN PATENT DOCUMENTS

| | | |
|---|---|---|
| DE | 4425344 | 1/1996 |
| GB | 2219560 | 12/1999 |

OTHER PUBLICATIONS

International search report for PCT/US2012/061332 dated Feb. 5, 2013.

*Primary Examiner* — Nathaniel Wiehe
*Assistant Examiner* — Michael Sehn
(74) *Attorney, Agent, or Firm* — O'Shea Getz P.C.

(57) ABSTRACT

A rotational duct blocker for a gas turbine engine includes a duct blocker rotor and a duct blocker stator. The duct blocker rotor includes a plurality of first vane segments that extend radially between an inner rotor platform and an outer rotor platform, and a plurality of first flow apertures that extend axially through the duct blocker rotor. Each first flow aperture also extends circumferentially between respective adjacent first vane segments. The duct blocker stator includes a plurality of second vane segments that extend radially between an inner stator platform and an outer stator platform, and a plurality of second flow apertures that extend axially through the duct blocker stator. Each second flow aperture also extends circumferentially between respective adjacent second vane segments. The first vane segments move circumferentially relative to the second vane segments to regulate fluid flowing between the first flow apertures and the second flow apertures.

22 Claims, 4 Drawing Sheets

(56) References Cited

U.S. PATENT DOCUMENTS

| | | |
|---|---|---|
| 4,534,166 A | 8/1985 | Kelm et al. |
| 5,048,286 A * | 9/1991 | Stransky et al. ............. 60/226.3 |
| 5,372,485 A | 12/1994 | Sumser |
| 6,226,977 B1 * | 5/2001 | Ichiryu et al. ................ 60/39.23 |
| 6,694,723 B2 | 2/2004 | Ward |
| 6,883,330 B2 | 4/2005 | Guinan et al. |
| 7,093,793 B2 | 8/2006 | Lair |
| 7,097,421 B2 * | 8/2006 | Swanson et al. ............... 415/127 |
| 7,101,146 B2 * | 9/2006 | Coull et al. .................... 415/127 |
| 7,871,242 B2 | 1/2011 | Swanson et al. |
| 8,707,799 B2 * | 4/2014 | Wiley et al. ...................... 73/861 |
| 2005/0129501 A1 | 6/2005 | Coull et al. |
| 2010/0189550 A1 | 7/2010 | Geist |

\* cited by examiner

GAS TURBINE ENGINE DUCT BLOCKER WITH ROTATABLE VANE SEGMENTS

This invention was made with government support under Contract No. N00019-02-C-3003 DOA1 awarded by the United States Navy. The government may have certain rights in the invention.

CROSS-REFERENCE TO RELATED APPLICATIONS

This application is related to U.S. patent application Ser. No. 13/335,577 filed on even date herewith, which is hereby incorporated by reference in its entirety.

BACKGROUND OF THE INVENTION

1. Technical Field

The present invention relates to gas turbine engines and, in particular, to a duct blocker with rotatable vane segments for regulating fluid flow through a gas turbine engine duct.

2. Background Information

A gas turbine engine may include a bypass flow duct that provides cooling air to one or more engine sections. In one gas turbine engine configuration, for example, the bypass flow duct directs cooling air to an engine combustor section, an engine turbine section and an engine nozzle section. The cooling air is typically bled from a central gas path at a location within an engine fan section or an engine compressor section. Bleeding cooling air from the central gas path, however, may reduce overall engine performance since the cooling air is not utilized to produce thrust. A typical gas turbine engine therefore may include a duct blocker within the bypass flow duct to regulate the quantity of cooling air provided to, for example, the nozzle section in order to increase overall engine performance.

A typical duct blocker includes a duct blocker stator and a duct blocker rotor. The duct blocker stator includes a plurality of leading edge vane segments and a plurality of trailing edge vane segments. The leading edge vane segments and the trailing edge vane segments are respectively circumferentially aligned, and define a plurality of duct blocker airfoil vanes and a plurality of cooling air passages. The duct blocker rotor includes an annular plate that is arranged axially between the leading edge vane segments and the trailing edge vane segments. The annular plate includes a plurality of circumferentially arranged airflow apertures.

During operation, the annular plate slideably rotates around a track, relative to the first and the second vane segments, to regulate the quantity of cooling air flowing through the duct blocker. In an open configuration, the airfoil apertures are circumferentially aligned with the cooling air passages, which permits the cooling air to flow unobstructed through the passages. In a closed configuration, the airfoil apertures are circumferentially aligned with the first and second vane segments, which restricts or prevents the cooling air from flowing through the cooling air passages. Thermal deflection of and hysteresis in the annular plate, however, may reduce precision control of how much cooling air flows through the duct blocker and, thus, may reduce the stability and performance of the engine.

SUMMARY OF THE DISCLOSURE

According to a first aspect of the invention, a rotational duct blocker for a gas turbine engine includes a duct blocker rotor and a duct blocker stator. The duct blocker rotor includes a plurality of first vane segments that extend radially between an inner rotor platform and an outer rotor platform, and a plurality of first flow apertures that extend axially through the duct blocker rotor. Each first flow aperture also extends circumferentially between respective adjacent first vane segments. The duct blocker stator includes a plurality of second vane segments that extend radially between an inner stator platform and an outer stator platform, and a plurality of second flow apertures that extend axially through the duct blocker stator. Each second flow aperture also extends circumferentially between respective adjacent second vane segments. The first vane segments move circumferentially relative to the second vane segments to regulate fluid flowing between the first flow apertures and the second flow apertures.

According to a second aspect of the invention, a gas turbine engine includes a rotational duct blocker arranged within a bypass flow duct. The duct blocker includes a duct blocker rotor and a duct blocker stator. The duct blocker rotor includes a plurality of first vane segments that extend radially between an inner rotor platform and an outer rotor platform, and a plurality of first flow apertures that extend axially through the duct blocker rotor. Each first flow aperture also extends circumferentially between respective adjacent first vane segments. The duct blocker stator includes a plurality of second vane segments that extend radially between an inner stator platform and an outer stator platform, and a plurality of second flow apertures that extend axially through the duct blocker stator. Each second flow aperture also extends circumferentially between respective adjacent second vane segments. The first vane segments move circumferentially relative to the second vane segments to regulate fluid flowing through the bypass flow duct.

The foregoing features and the operation of the invention will become more apparent in light of the following description and the accompanying drawings.

DETAILED DESCRIPTION OF THE INVENTION

Figure 1:
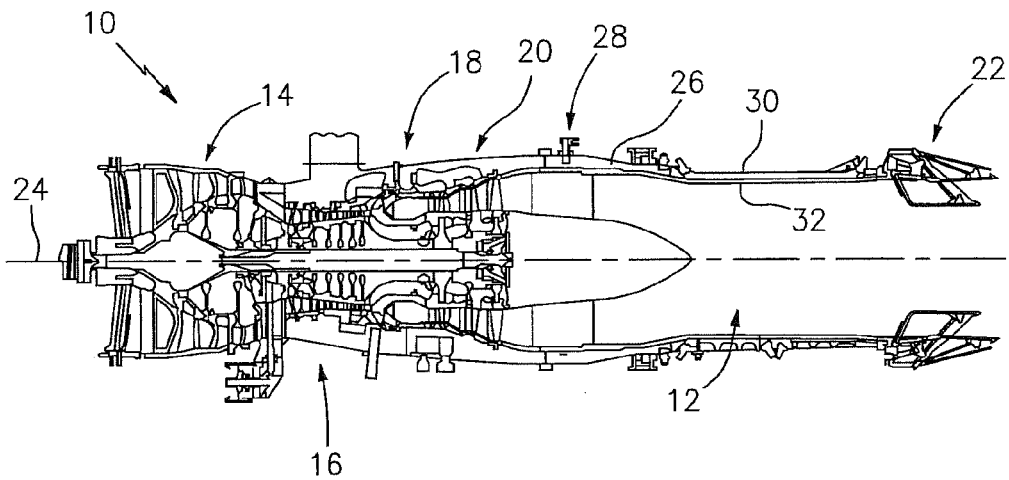
FIG. 1 is a cross-sectional illustration of a gas turbine engine.

FIG. 1 is a cross-sectional illustration of a gas turbine engine 10. The engine 10 includes a central gas path 12 that extends through a fan section 14, a compressor section 16, a combustor section 18, a turbine section 20 and a nozzle section 22, which are sequentially arranged along an axial centerline 24. The engine 10 also includes an annular bypass flow duct 26 and a rotational duct blocker 28. The bypass flow duct 26 is formed between an outer engine case 30 and an outer gas path liner 32 that lines an outer perimeter of the central gas path 12 within, for example, the compressor section 16, the combustor section 18, the turbine section 20 and the nozzle section 22. The duct blocker 28 is arranged within the bypass flow duct 26, and is located axially between the fan section 14 and the nozzle section 22 (e.g., between the turbine section 20 and the nozzle section 22).

Figure 2:
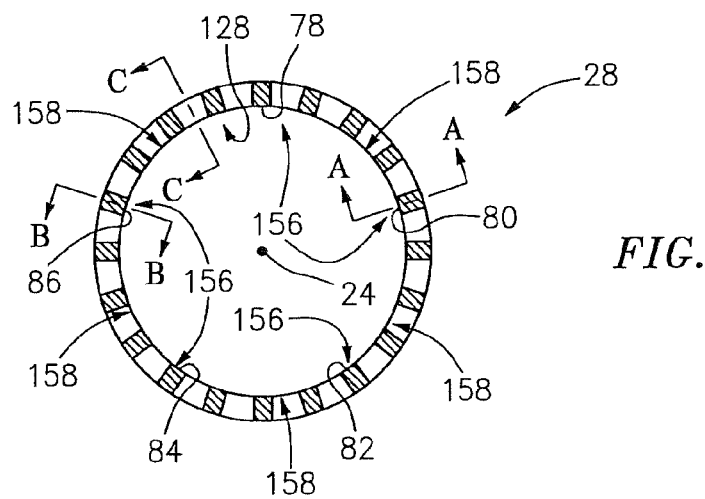
FIG. 2 is a front view illustration of a rotational duct blocker.
Figure 3:
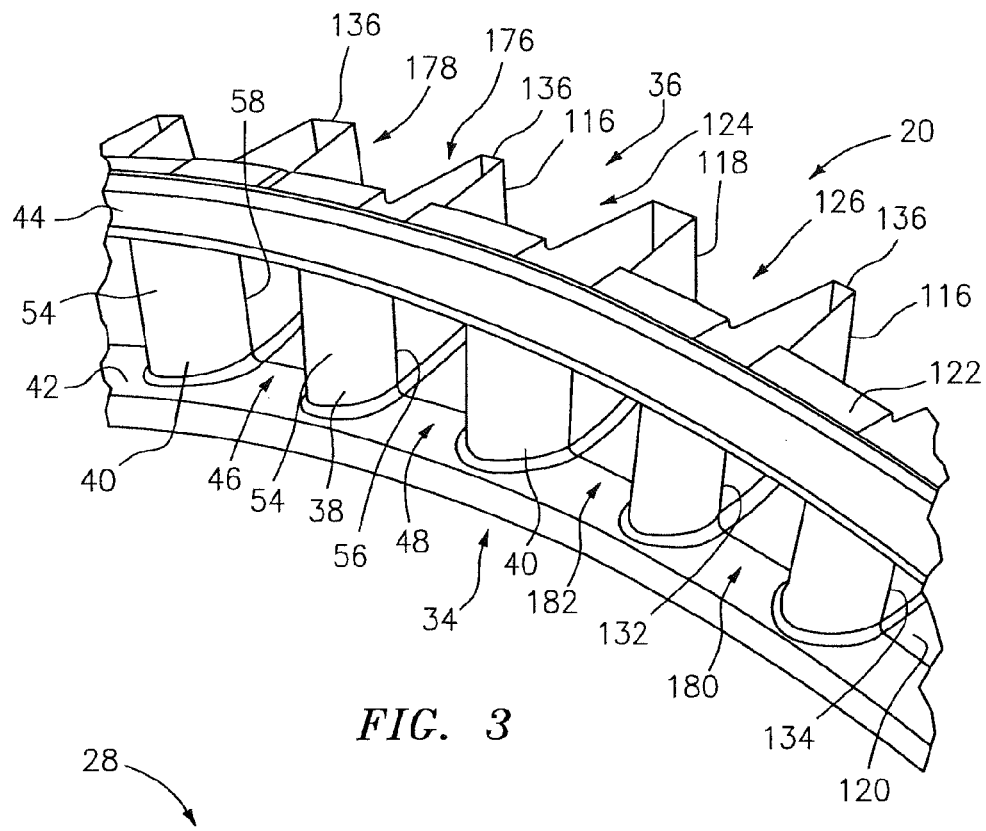
FIG. 3 is a partial perspective illustration of a rotational duct blocker arranged in a first configuration.
Figure 4:
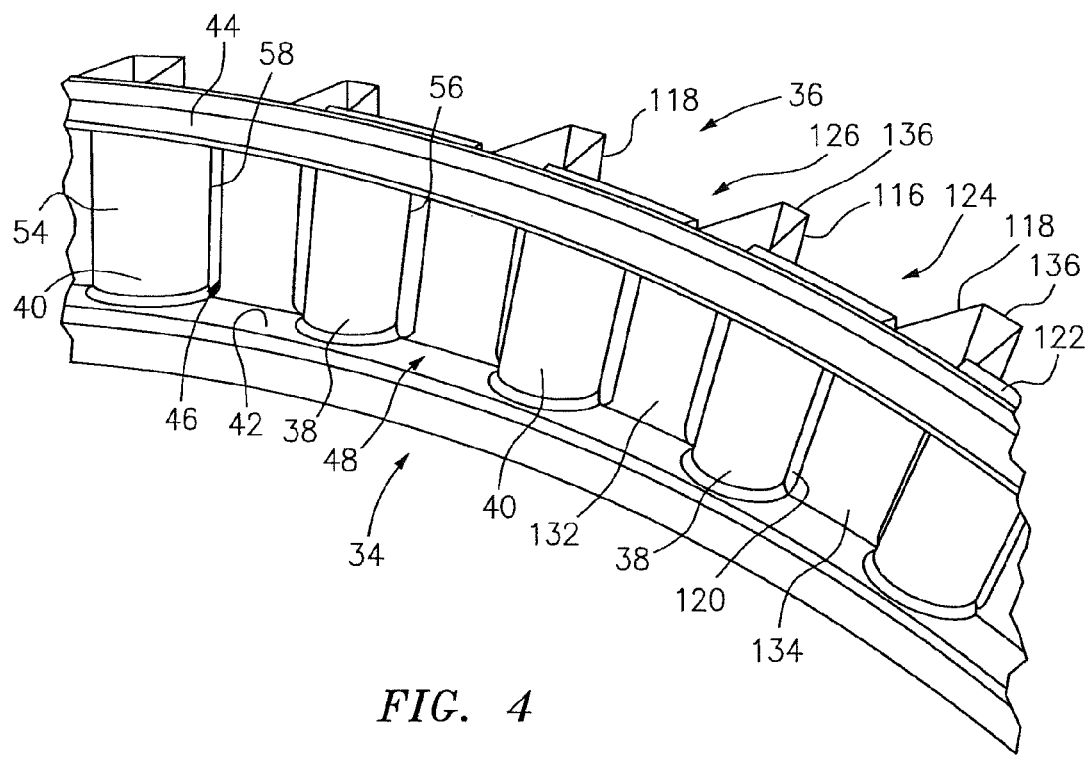
FIG. 4 is a partial perspective illustration of a rotational duct blocker arranged in a second configuration.

FIG. 2 is a front view illustration of the duct blocker 28. The duct blocker may have an annular geometry that extends circumferentially around the axial centerline 24. FIG. 3 is a partial perspective illustration of the duct blocker 28 arranged in a first configuration (e.g., an open configuration). FIG. 4 is a partial perspective illustration of the duct blocker 28 arranged in a second configuration (e.g., a closed configuration). Referring to FIGS. 3 and 4, the duct blocker 28 includes an annular duct blocker rotor 34 and an annular duct blocker stator 36.

Figure 5:
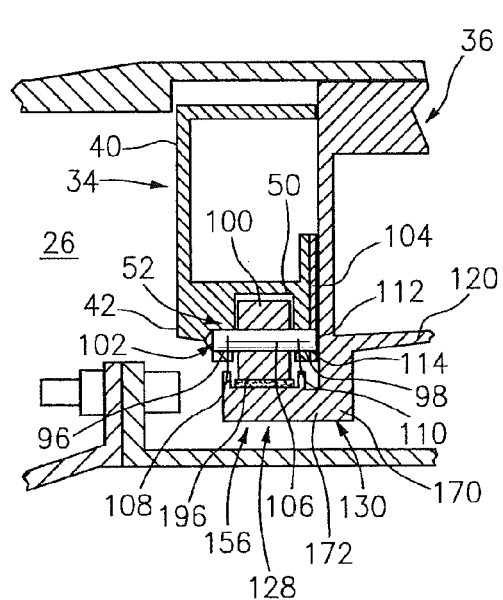
FIG. 5 is a partial cross-sectional illustration of the duct blocker illustrated in FIG. 2 at section A-A.
Figure 6:
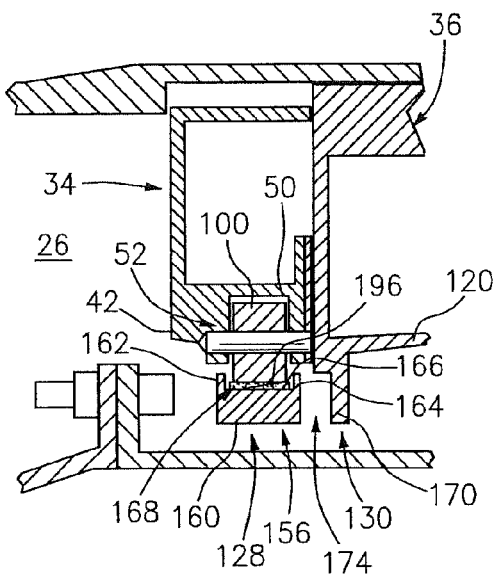
FIG. 6 is a partial cross-sectional illustration of the duct blocker illustrated in FIG. 2 at section B-B.

The duct blocker rotor 34 includes a plurality of first vane segments 38 and 40 (e.g., leading edge vane segments), an inner rotor platform 42, an outer rotor platform 44 and a plurality of first flow apertures 46 and 48. Referring to FIGS. 5 and 6, the duct blocker rotor 34 may also include a plurality of roller element wells 50 and a plurality of roller element assemblies 52.

Figure 7:
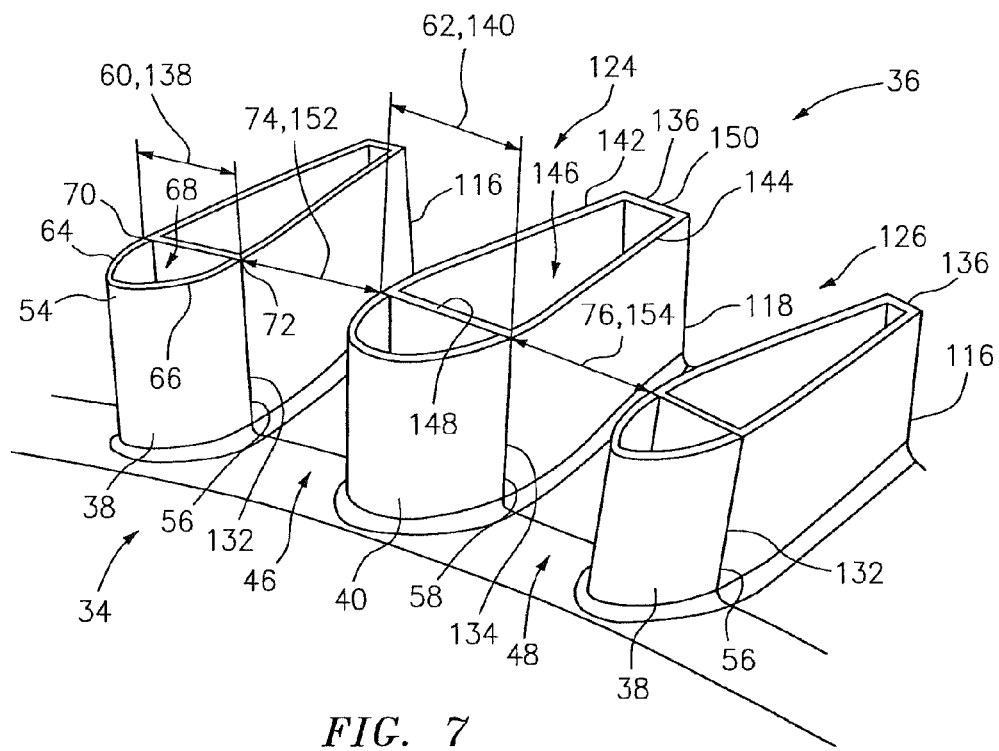
FIG. 7 is a partial perspective side-sectional illustration of the duct blocker illustrated in FIG. 3.

Referring again to FIGS. 3 and 4, the first vane segments 38 and 40 extend radially between the inner rotor platform 42 and the outer rotor platform 44. Each first vane segment 38, 40 extends axially from a respective first vane edge 54 (e.g., a vane leading edge) to a respective first vane segment end 56, 58. Referring now to FIG. 7, the first vane segment ends 56 have a circumferential first vane segment width 60. The first vane segment ends 58 have a circumferential second vane segment width 62 that is greater than or equal to the first vane segment width 60. The first vane segment width 60 and the second vane segment width 62 may be sized, in some embodiments, to provide a vernier duct blocker pattern as disclosed in U.S. Pat. No. 7,097,421, which is hereby incorporated by reference in its entirety, and is assigned to the assignee as the present invention.

Referring still to FIG. 7, one or more of the first vane segments 38 and 40 may include a curved first sidewall 64 and a curved second sidewall 66, which define an interior vane segment channel 68 circumferentially therebetween. The first sidewall 64 and the second sidewall 66 are connected at a respective first vane edge 54, and extend axially to a respective first vane segment end 56, 58. An axial distal end 70 of the first sidewall 64 and an axial distal end 72 of the second sidewall 66 may be circumferentially separated by the vane segment channel 68, which provides the respective first vane segment 38, 40 with a channeled cross-sectional geometry.

Referring again to FIGS. 3 and 4, the first flow apertures 46 and 48 extend axially through the duct blocker rotor 34. The first flow apertures 46 and 48 extend radially between the inner rotor platform 42 and the outer rotor platform 44. Each first flow aperture 46, 48 extends circumferentially between respective adjacent first vane segments 38 and 40. Referring now to FIG. 7, the first flow apertures 46 have a first flow aperture outlet width 74 that extends circumferentially between respective adjacent first vane segment ends 56 and 58. The first flow apertures 48 have a second flow aperture outlet width 76, where the second flow aperture outlet width 76 may be greater than or equal to the first flow aperture outlet width 74. The first flow aperture outlet width 74 and the second flow aperture outlet width 76 may be sized, in some embodiments, to provide a vernier duct blocker opening pattern as disclosed in U.S. Pat. No. 7,097,421.

Figure 8:
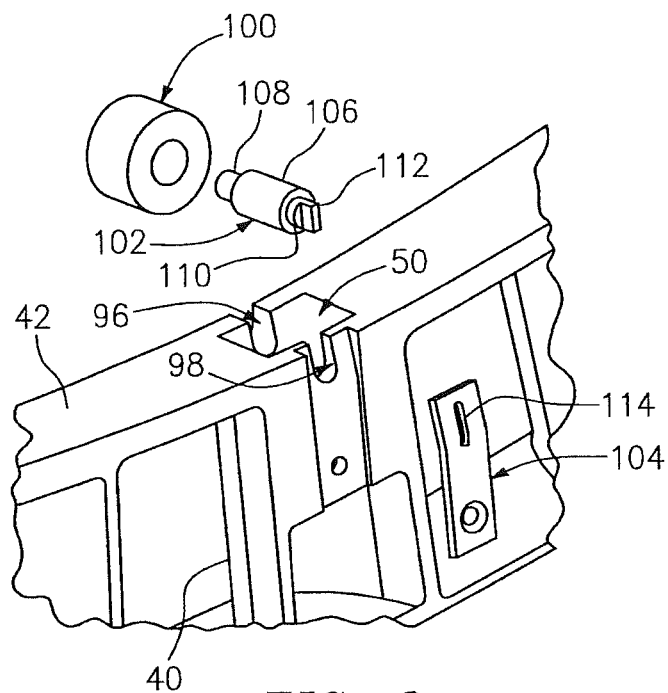
FIG. 8 is an exploded perspective illustration of a roller element assembly and a roller element well.

Referring to FIGS. 5 and 8, each roller element well 50 may extend radially through the inner rotor platform 42 and into a respective one of the first vane segments 40 at a respective circumferential location (e.g., at location 78, 80, 82, 84 or 86 illustrated in FIG. 2). Each roller element well 50 extends axially between a first mounting aperture 96 and a second mounting aperture 98.

Each roller element assembly 52 includes a roller element 100, a roller element axle 102 and an axle mounting clip 104. The roller element axle 102 includes a roller element bearing segment 106 connected between a first mounting segment 108 and a second mounting segment 110 having a keyed end 112. The axle mounting clip 104 includes a keyway aperture 114 that extends therethrough. Referring to FIG. 5, the roller element 100 is rotatably mounted onto the roller element bearing segment 106. The roller element 100 is located within a respective one of the roller element wells 50. The first mounting segment 108 is seated within the first mounting aperture 96, and the second mounting segment 110 is seated within the second mounting aperture 98. The keyed end 112 extends into the keyway aperture 114, and the axle mounting clip 104 is connected to a respective one of the first vane segments 40 (e.g., via a rivet).

Figure 9:
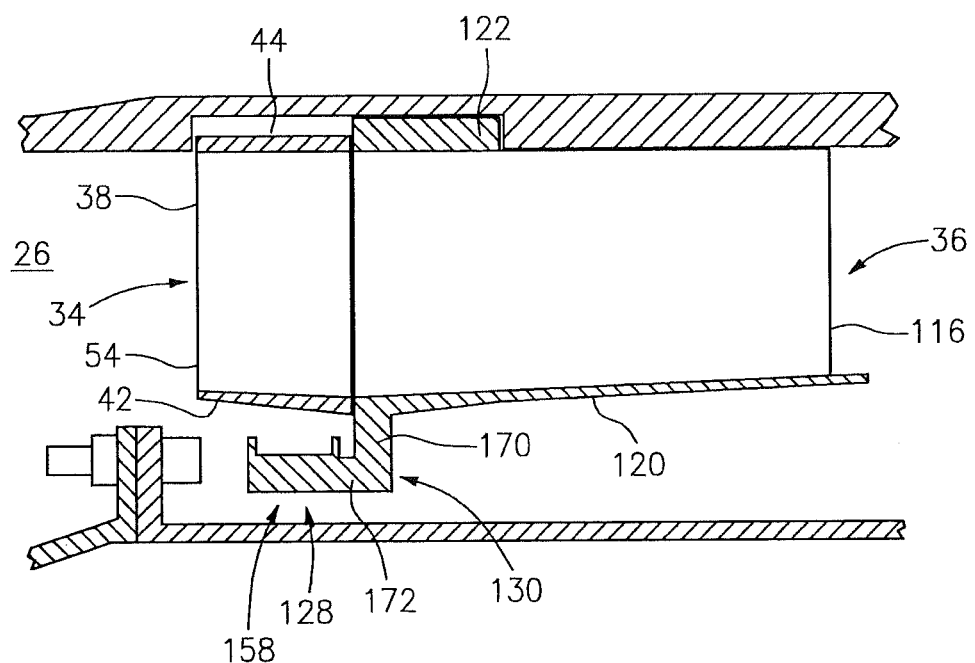
FIG. 9 is a cross-sectional illustration of the duct blocker illustrated in FIG. 2 at section C-C.

Referring again to FIGS. 3 and 4, the duct blocker stator 36 includes a plurality of second vane segments 116 and 118 (e.g., trailing edge vane segments), an inner stator platform 120, an outer stator platform 122 and a plurality of second flow apertures 124 and 126. Referring to FIGS. 5, 6 and 9, the duct blocker stator 36 also may include a roller element track 128 and a track mount 130.

Referring again to FIGS. 3 and 4, the second vane segments 116 and 118 extend radially between the inner stator platform 120 and the outer stator platform 122. Each second vane segment 116, 118 extends axially from a respective second vane segment end 132, 134 to a respective second vane edge 136 (e.g., a vane trailing edge). Referring now to FIG. 7, the second vane segment ends 132 have a circumferential first vane segment width 138 that may be substantially equal to the first vane segment width 60. The second vane segment ends 134 have a circumferential second vane segment width 140 that may be substantially equal to the second vane segment width 62.

One or more of the second vane segments 116 and 118 may include a first sidewall 142 and a second sidewall 144, which define an interior vane segment channel 146 circumferentially therebetween. The first sidewall 142 and the second sidewall 146 may be connected at the respective second vane segment end 132, 134 by a first endwall 148. The first sidewall 142 and the second sidewall 144 may be connected at the respective second vane edge 136 by a second endwall 150.

Referring again to FIG. 3, the second flow apertures 124 and 126 extend axially through the duct blocker stator 36. The second flow apertures 124 and 126 extend radially between the inner stator platform 120 and the outer stator platform 122. Each second flow aperture 124, 126 extends circumferentially between respective adjacent second vane segments 116 and 118. Referring now to FIG. 7, the second flow apertures 124 have a first flow aperture inlet width 152 that extends circumferentially between respective adjacent second vane segment ends 132 and 134, where the first flow aperture width 152 may be substantially equal to the first flow aperture outlet width 62. The second flow apertures 126 have a second flow aperture inlet width 154, where the second flow aperture inlet width 154 may be substantially equal to the second flow aperture outlet width 76.

Referring to FIG. 2, the roller element track 128 includes a plurality of first track segments 156 and a plurality of second track segments 158. Each first track segment 156 extends circumferentially between respective adjacent second track segments 158. Each second track segment 158 extends circumferentially between respective adjacent first track segments 156. Referring to FIG. 6, each first track segment 156 includes a track body 160, a first track curb 162 and a second track curb 164. The track body 160 has an outer radial track surface 166 that extends axially between the first track curb 162 and the second track curb 164. Each track curb 162, 164 extends radially outwards from the outer radial track surface 166, which defines an annular track channel 168 therebetween.

Referring to FIGS. 5, 6 and 9, the track mount 130 includes an annular mounting rail 170, a plurality of track mount segments 172 (see FIGS. 5 and 9), and a plurality of circumferential slots 174 (see FIG. 6). Referring to FIGS. 5 and 9, the mounting rail 170 extends radially inward from the inner stator platform 120 to the track mount segments 172. Referring to FIG. 5, some of the track mount segments 172 respectively axially extend from and connect (e.g., rigidly connect) some of the first track segments 156 (e.g., at locations 78 and 82 illustrated in FIG. 2) to the mounting rail 170. Referring to FIG. 9, a quantity of the track mount segments 172 respectively axially extend from and connect (e.g., rigidly connect) the second track segments 158 to the mounting rail 170. Referring to FIG. 6, the slots 174 respectively axially separate a quantity of the first track segments 156 (e.g., a locations 80, 84 and 86 illustrated in FIG. 2) from the mounting rail 170. Each slot 174 also extends circumferentially along a respective first track segment 156 between respective adjacent track mount segments 172.

Referring still to FIG. 6, the roller element track 128 is located radially within the inner rotor platform 42. Each respective roller element 100 is arranged within the track channel 168, and is in rolling contact with the outer radial track surface 166. Each respective roller element 100 may also be preloaded (i.e., biased) against the outer radial track surface 166 such that one or more of the first track segments 156 (e.g., at the locations 80, 84 and 86 illustrated in FIG. 2) are depressed radially inwards, for example, when the engine is non-operational. The preload may reduce false brinelling and wear to the roller element track 128 during engine operation. The radial first track segment depression may accommodate differences in thermal expansion between the duct blocker rotor 34 and the duct blocker stator 36 during engine operation.

Referring to FIGS. 3 and 4, the inner rotor platform 42 is arranged axially adjacent to the inner stator platform 120. The outer rotor platform 44 is arranged axially adjacent to the outer stator platform 122. The first vane segments 38 and 40 are arranged axially adjacent to the second vane segments 116 and 118.

Referring to FIG. 5, during engine operation the duct blocker rotor 34 rotates around the roller element track 128, on the roller elements 100, to regulate fluid flow through the bypass flow duct 26. More particularly, referring to FIGS. 3 and 4, the first vane segments 38 and 40 move circumferentially relative to the second vane segments 116 and 118 to regulate how much fluid may flow from the first flow apertures 46 and 48 to the second flow apertures 124 and 126. The first vane segments 38 and 40 may move, for example, between the first configuration (e.g., the open configuration) illustrated in FIG. 3 and the second configuration (e.g., the closed configuration) illustrated in FIG. 4.

In the first configuration (e.g., the open configuration) illustrated in FIG. 3, the first vane segments 38 and 40 and the second vane segments 116 and 118 are respectively circumferentially aligned and define a plurality of duct blocker vanes 176 and 178. Each duct blocker vane 176, 178 may have an airfoil cross-sectional geometry that extends axially from the first vane edge 54 to the second vane edge 136. The first flow apertures 46 and 48 and the second flow apertures 124 and 126 are also respectively circumferentially aligned and define a plurality of fluid flow passages 180 and 182 that extend axially through the duct blocker 28.

In the second configuration (e.g., the closed configuration) illustrated in FIG. 4, the first vane segments 38 and 40 are respectively circumferentially aligned with the second flow apertures 124 and 126. The first vane segments 38 and 40 therefore substantially block the fluid from flowing into the second flow apertures 124 and 126 and, thus, into the nozzle section 22 (see FIG. 1).

Figure 10:
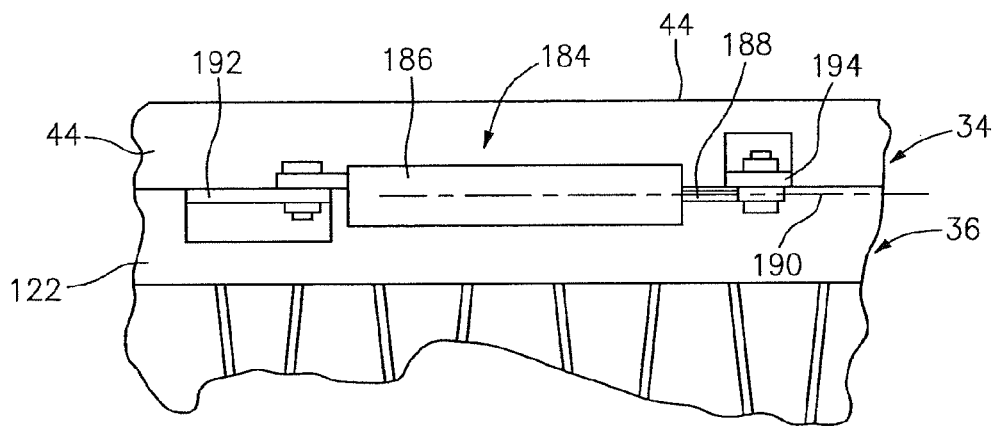
FIG. 10 is a partial side view illustration of a rotational duct blocker that includes a duct blocker actuator.

Referring to FIG. 10, the duct blocker rotor 34 may be rotated into the first configuration, the second configuration, or one of a plurality of circumferentially intermediate configurations (e.g., semi-open configurations) using a duct blocker actuator 184. The duct blocker actuator 184 may include an actuator base 186 and an actuator arm 188 that extends into and out of the actuator base 186 along an actuator axis 190. The actuator base 186 may be pivotally mounted to an actuator base mounting flange 192 that is connected to the outer stator platform 122. The actuator arm 188 may be pivotally mounted to an actuator arm mounting flange 194 that is connected to the outer rotor platform 44. An alternative embodiment of a duct blocker actuator is disclosed in U.S. Pat. No. 7,871,242, which is hereby incorporated by reference in its entirety, and is assigned to the assignee as the present invention.

Referring to FIGS. 5 and 6, in some embodiments, the roller element track 128 may also include a plurality of hardened run strips 196. Each of the run strips 196 may be mounted on a respective one of the outer radial track surfaces 166 to reduce roller element track 128 wear imparted by the roller elements 100. Alternatively, the roller element track 128 may include an annular run strip that is mounted to each of the track segments.

In some embodiments, the track mount 130 may rigidly support each of the track segments.

In some embodiments, the duct blocker rotor 34 may be configured to slideably rotate against the roller element track 128.

In some embodiments, one or more of the first vane segments and/or one or more of the second vane segments may be configured as a solid vane segment. Alternatively, one or more of the first vane segments may have an endwall connecting the first sidewall and the second sidewall at the first vane segment end. One of ordinary skill in the art will appreciate that one or more of the first vane segments and/or one or more of the second vane segments may take various alternative shapes and configurations based on the particular engine cooling parameters.

In some embodiments, the duct blocker rotor 34 may be arranged axially downstream of the duct blocker stator 36.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. A rotational duct blocker for a gas turbine engine, comprising:
   a duct blocker rotor comprising a plurality of first vane segments that extend radially between an inner rotor platform and an outer rotor platform, and a plurality of first flow apertures that extend axially through the duct blocker rotor, wherein each first flow aperture extends circumferentially between respective adjacent first vane segments;
   a duct blocker stator comprising a plurality of second vane segments that extend radially between an inner stator platform and an outer stator platform, and a plurality of second flow apertures that extend axially through the duct blocker stator, wherein each second flow aperture extends circumferentially between respective adjacent second vane segments; and
   a track radially next to the duct blocker rotor;
   wherein the duct blocker rotor is adapted to move circumferentially along the track such that the first vane segments move circumferentially relative to the second vane segments to regulate fluid flowing between the first flow apertures and the second flow apertures.

2. The duct blocker of claim 1, wherein the duct blocker rotor is configured to ride on one or more roller elements which roll on the track.

3. The duct blocker of claim 1, wherein one of the first vane segments extends axially from a respective vane leading edge to the duct blocker stator, and wherein one of the second vane segments extends axially from the duct blocker rotor to a respective vane trailing edge.

4. The duct blocker of claim 1, wherein one of the first vane segments comprises a vane segment channel that extends circumferentially between a first sidewall and a second sidewall.

5. The duct blocker of claim 4, wherein one of the first vane segments extends axially between a vane leading edge and a vane segment end, wherein the first sidewall and the second sidewall are connected at the vane leading edge, and wherein the first sidewall and the second sidewall are separated by the vane segment channel at the vane segment end.

6. The duct blocker of claim 1, wherein one of the second vane segments comprises a vane segment channel that extends circumferentially between a first sidewall and a second sidewall.

7. The duct blocker of claim 6, wherein one of the second vane segments extends axially between a vane segment end and a vane trailing edge, wherein the first sidewall and the second sidewall are connected by an endwall at the vane segment end, and wherein the first sidewall and the second sidewall are connected at the vane trailing edge.

8. The duct blocker of claim 1, wherein a first of the plurality of the first vane segments comprises a circumferential first vane segment width, and wherein a second of the plurality of the first vane segments comprises a circumferential second vane segment width that is greater than the first vane segment width.

9. The duct blocker of claim 1, wherein a first of the plurality of the first flow apertures comprises a circumferential first flow aperture width, and wherein a second of the plurality of the first flow apertures comprises a circumferential second flow aperture width that is greater than the first flow aperture width.

10. The duct blocker of claim 1, further comprising a duct blocker actuator that comprises an actuator base and an actuator arm, wherein the actuator base is connected to the duct blocker stator, and the actuator arm is connected to the duct blocker rotor, and extends into and out of the actuator base to rotate the duct blocker rotor relative to the duct blocker stator.

11. The duct blocker of claim 10, further comprising an actuator base mounting flange and an actuator arm mounting flange, wherein the base mounting flange connects the actuator base to the outer stator platform, and the arm mounting flange connects the actuator arm to the outer rotor platform.

12. A gas turbine engine, comprising:
   a bypass flow duct; and
   a rotational duct blocker arranged within the bypass flow duct, and comprising
      a duct blocker rotor comprising a plurality of first vane segments that extend radially between an inner rotor platform and an outer rotor platform, and a plurality of first flow apertures that extend axially through the duct blocker rotor, wherein each first flow aperture extends circumferentially between respective adjacent first vane segments; and
      a duct blocker stator comprising a plurality of second vane segments that extend radially between an inner stator platform and an outer stator platform, and a plurality of second flow apertures that extend axially through the duct blocker stator, wherein each second flow aperture extends circumferentially between respective adjacent second vane segments;
      wherein the duct blocker rotor is configured to ride on one or more roller elements which roll on a track radially next to the duct blocker rotor, and wherein the first vane segments move circumferentially relative to the second vane segments to regulate fluid flowing through the bypass flow duct.

13. The duct blocker of claim 2, wherein the track is radially within the duct blocker rotor.

14. The engine of claim 12, wherein each first vane segment extends axially from a respective vane leading edge to the duct blocker stator, and wherein each second vane segment extends axially from the duct blocker rotor to a respective vane trailing edge.

15. The engine of claim 12, wherein each first vane segment comprises a vane segment channel that extends circumferentially between a first sidewall and a second sidewall.

16. The engine of claim 15, wherein each first vane segment extends axially between a vane leading edge and a vane segment end, wherein the first sidewall and the second sidewall are connected at the vane leading edge, and wherein the first sidewall and the second sidewall are separated by the vane segment channel at the vane segment end.

17. The engine of claim 12, wherein each second vane segment comprises a vane segment channel that extends circumferentially between a first sidewall and a second sidewall.

18. The engine of claim 17, wherein each second vane segment extends axially between a vane segment end and a vane trailing edge, wherein the first sidewall and the second sidewall are connected by an endwall at the vane segment end, and wherein the first sidewall and the second sidewall are connected at the vane trailing edge.

19. The engine of claim 12, wherein a first of the plurality of the first vane segments comprises a circumferential first vane segment width, and wherein a second of the plurality of the first vane segments comprises a circumferential second vane segment width that is greater than the first vane segment width.

20. The engine of claim 12, wherein a first of the plurality of the first flow apertures comprises a circumferential first flow aperture width, and wherein a second of the plurality of the first flow apertures comprises a circumferential second flow aperture width that is greater than the first flow aperture width.

21. The engine of claim 12, further comprising a duct blocker actuator that comprises an actuator base and an actuator arm, wherein the actuator base is connected to the duct blocker stator, and the actuator arm is connected to the duct blocker rotor, and extends into and out of the actuator base to rotate the duct blocker rotor relative to the duct blocker stator.

22. The engine of claim 21, further comprising an actuator base mounting flange and an actuator arm mounting flange, wherein the base mounting flange connects the actuator base to the outer stator platform, and the arm mounting flange connects the actuator arm to the outer rotor platform.

* * * * *